(12) United States Patent
Parkinson et al.

(10) Patent No.: US 7,647,350 B2
(45) Date of Patent: *Jan. 12, 2010

(54) DATABASE ACCESS SERVER WITH COMPRESSION TRANSLATOR

(75) Inventors: Steven W. Parkinson, Mountain View, CA (US); Nathan G. Kinder, Mountain View, CA (US)

(73) Assignee: Red Hat, Inc., Raleigh, NC (US)

( * ) Notice: Subject to any disclaimer, the term of this patent is extended or adjusted under 35 U.S.C. 154(b) by 171 days.

This patent is subject to a terminal disclaimer.

(21) Appl. No.: 11/470,603

(22) Filed: Sep. 6, 2006

(65) Prior Publication Data

US 2008/0071724 A1    Mar. 20, 2008

(51) Int. Cl.
*G06F 17/30* (2006.01)
*G06F 17/00* (2006.01)

(52) U.S. Cl. .................. 707/104.1; 707/2; 707/100; 707/101; 707/200; 707/203; 709/246; 709/247

(58) Field of Classification Search ............ 707/1, 707/101, 100, 200, 203, 104.1; 709/246, 709/316, 247; 710/68; 380/200; 725/116; 379/211.01

See application file for complete search history.

(56) References Cited

U.S. PATENT DOCUMENTS

| | | | | |
|---|---|---|---|---|
| 5,838,996 A * | 11/1998 | deCarmo | .............. | 710/68 |
| 5,996,022 A * | 11/1999 | Krueger et al. | .............. | 709/247 |
| 6,308,222 B1 * | 10/2001 | Krueger et al. | .............. | 709/247 |
| 6,463,445 B1 * | 10/2002 | Suzuki et al. | .............. | 707/200 |
| 6,539,379 B1 | 3/2003 | Vora | | |
| 6,593,860 B2 * | 7/2003 | Lai et al. | .............. | 341/50 |
| 6,635,089 B1 | 10/2003 | Burkett et al. | | |
| 6,732,183 B1 * | 5/2004 | Graham | .............. | 709/231 |
| 6,795,863 B1 * | 9/2004 | Doty, Jr. | .............. | 709/231 |
| 6,850,928 B1 | 2/2005 | McClure et al. | | |
| 2002/0147857 A1 * | 10/2002 | Sanchez et al. | .............. | 709/316 |
| 2003/0012376 A1 * | 1/2003 | Wee et al. | .............. | 380/200 |
| 2003/0191749 A1 * | 10/2003 | Espino | .............. | 707/3 |
| 2004/0049598 A1 * | 3/2004 | Tucker et al. | .............. | 709/246 |
| 2004/0148305 A1 * | 7/2004 | Bollich | .............. | 707/101 |
| 2005/0004976 A1 * | 1/2005 | Mavrogeanes et al. | .............. | 709/203 |
| 2005/0053216 A1 * | 3/2005 | Spencer et al. | .............. | 379/211.01 |
| 2005/0091696 A1 * | 4/2005 | Wolfe et al. | .............. | 725/116 |
| 2005/0246752 A1 * | 11/2005 | Liwerant et al. | .............. | 725/109 |
| 2006/0026162 A1 * | 2/2006 | Salmonsen et al. | .............. | 707/10 |

(Continued)

OTHER PUBLICATIONS

Nero AG, Nero MediaHome QuickStart, 2002.*

(Continued)

*Primary Examiner*—James Trujillo
*Assistant Examiner*—William Spieler
(74) *Attorney, Agent, or Firm*—Blakely, Sokoloff, Taylor & Zafman LLP

(57) ABSTRACT

A database access server includes a network interface device and a processing device coupled to the network interface device via a bus. The network interface device receives a data request that includes a data identifier. The processing device retrieves data having the data identifier. The processing device determines if the retrieved data is compressed. The processing device decompresses the retrieved data if the retrieved data is compressed. The processing device sends the uncompressed retrieved data in response to the data request.

18 Claims, 3 Drawing Sheets

U.S. PATENT DOCUMENTS

2007/0079010 A1* 4/2007 Heredia et al. .............. 709/246
2007/0162487 A1* 7/2007 Frailey ....................... 707/102

OTHER PUBLICATIONS

Ritchie et al., UPnP AV Architecture:0.83, Jun. 12, 2002.*
Ritchie, MediaServer:1 Device Template Version 1.01, Jun. 25, 2002.*
Beal, Digital Audio Formats, Sept. 30, 2005.*
Yeong, W., Howes, T. and Kille, S., Lightweight Directory Access Protocol, Mar. 1995, RFC 1777.
Wahl, M., Howes, T., and Kille, S., Lightweight Directory Access Protocol (v3), Dec. 1997, RFC 2251, Copyright (C) The Internet Society (1997).
Wahl, M., Coulbeck, A., Howes, T., and Kille, S., Lightweight Directory Access Protocol (v3): Attribute Syntax Definitions, Dec. 1997, RFC 2252, Copyright (C) The Internet Society (1997).
Wahl, M., A Sumary of the X.500(96) User Schema for use with LDAPv3, Dec. 1997, RFC 2256, Copyright (C) The Internet Society (1997).
Wahl, M. and Howes, T., Use of Language Codes in LDAP, May 1999, RFC 2596, Copyright (C) The Internet Society (1999).
Red Hat Linux 9: Red Hat Linux Reference Guide, 2003, Raleigh, NC.
Thompson, Dan, Understanding LDAP, Jul. 2000, Microsoft Corporation, Redmond, WA.

* cited by examiner

DATABASE ACCESS SERVER WITH COMPRESSION TRANSLATOR

TECHNICAL FIELD

Embodiments of the present invention relate to data processing, and more specifically to a database access server with a compression translator.

BACKGROUND

A database may be used to store items of information in a manner that permits a particular item to be accessed efficiently. The database and the mechanism to retrieve items from the database may be part of a database server. The mechanism to accept requests for items in the database from a user and to display requested items to the user may be part of a client.

The database server and the client may each be a process that is carried out by a machine such as a computer. The database server and the client may be processes on the same machine or they may be processes on separate machines that are communicatively coupled. Either or both of the database server and the client processes may be carried out by a plurality of machines that are communicatively coupled.

A database access server may be used to communicatively couple a client and a database server. The database access server may allow the client to access the database server without knowing the implementation of the database server. The database access server may allow the client to access a plurality of database servers as though they were a single database server.

The database access server may be a process that is carried out by a machine such as a computer. The database access server may be a process on the same machine as the database server or it may be a process on a separate machine that is communicatively coupled to the one or more machines providing the database server. The database access server may communicatively couple the client server to the database server.

An exemplary database server is a Lightweight Directory Access Protocol (LDAP) directory server. LDAP is a set of open protocols used to access centrally stored information over a network. It is based on the X.500 standard for directory sharing, but is less complex and resource intensive. Like X.500, LDAP organizes information in a hierarchal manner using directories. These directories can store a variety of information and can enable access to the information from any machine on the LDAP enabled network.

The LDAP server can use a variety of databases to store a directory, each optimized for quick and copious read operations. When an LDAP client application connects to an LDAP server, it can either query a directory or attempt to modify it. In the event of a query, the server either answers the query or, if it can not answer locally, it can refer the query to an LDAP server which does have the answer. If the client application is attempting to modify information in an LDAP directory, the server verifies that the user has permission to make the change and then adds or updates the information.

The main benefit of using LDAP is that information for an entire organization can be consolidated into a central repository. LDAP supports a number of back-end databases in which to store directories. This allows administrators the flexibility to deploy the database best suited for the type of information the server is to disseminate. Because LDAP has a well-defined client Application Programming Interface (API), the number of LDAP-enabled applications are numerous and increasing in quantity and quality.

BRIEF DESCRIPTION OF THE DRAWINGS

The present invention is illustrated by way of example and not limitation in the figures of the accompanying drawings, in which like references indicate similar elements and in which.

DETAILED DESCRIPTION

Figure 1:
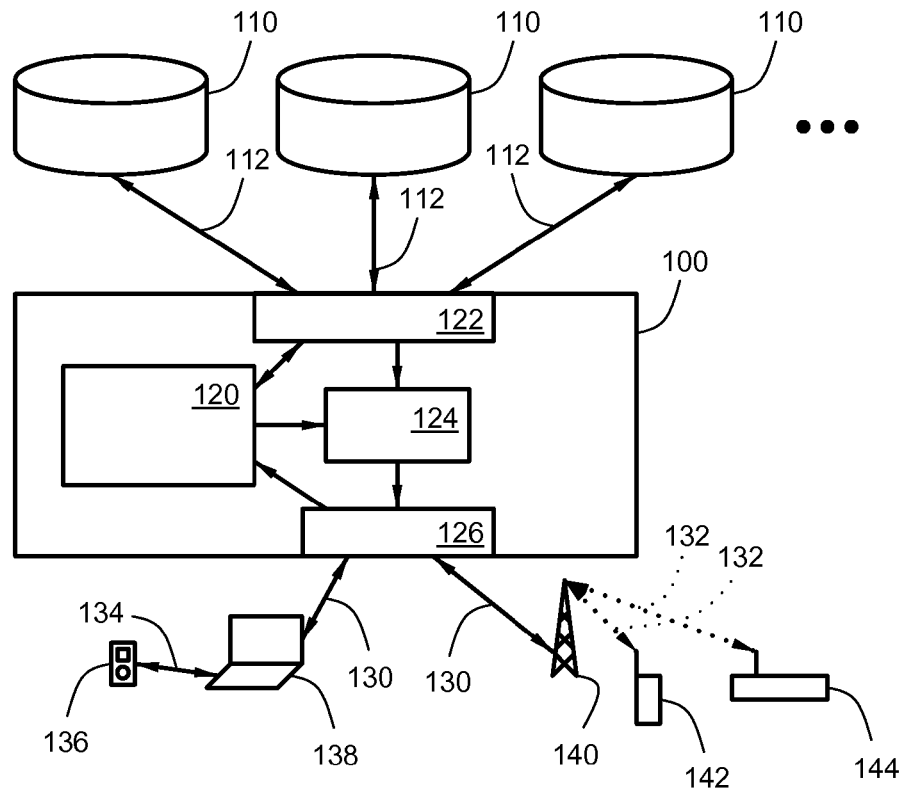
FIG. 1 is a block diagram of a system in which embodiments of the invention may operate.

Embodiments of a database access server with a compression translator are described herein. A database access server includes a network interface device and a processing device coupled to the network interface device via a bus. The network interface device receives a data request that includes a data identifier. The processing device retrieves data having the data identifier. The processing device determines if the retrieved data is compressed. The processing device decompresses the retrieved data if the retrieved data is compressed. The processing device sends the uncompressed retrieved data in response to the data request. In one embodiment, the database access server is a Lightweight Directory Access Protocol (LDAP) directory server.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

The presently disclosed system and method can be implemented using hardware, software or a combination of hardware and software. Specifically, the disclosed system and method can be implemented using either object-oriented programming languages, like the Java and C++ programming languages, or procedural programming languages such as the C programming language. The disclosed system and method can be implemented using a computer system with a single personal computer or a network of multiple computers.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-accessible storage medium, which may also be referred to as a computer readable medium, includes any mechanism for storing or transmitting information in a form readable by a machine (e.g., a computer). For example, a machine-accessible storage medium includes read only memory ("ROM"); random access memory ("RAM"); magnetic disk storage media; optical storage media; flash memory devices; electrical, optical, or acoustical.

Reference will now be made in detail to exemplary embodiments of the disclosed system which are also illustrated in the accompanying drawings. Although the description includes exemplary embodiments, it can be easily seen that other embodiments are possible, and changes can be made to the embodiments described without departing from the spirit of the disclosed system and method.

FIG. 1 shows a database access server 100 communicatively coupled to a plurality of database servers 110 by data access links 112. The database access server 100 may be a process that is executed by a general purpose computer or by a specialized processor. The database access server 100 may be provided by a dedicated device or it may be provided by a device that provides other services as well, possibly including one or more of the database servers 110.

The database access server 100 may include a client interface 126 with client input ports and client output ports. The client ports may be coupled to a variety of client devices 136, 138, 142, 144 by network connections 130, 132, such as an Internet connection. The network connections may be wired 130 or wireless 132. The wireless connections may be provided by a wireless gateway 140 that is coupled to the client interface 126 by a wired connection 130. Client devices 136 may be connected to the client interface 126 indirectly by a link 134 to another client device 138 that serves as a gateway to the database access server 100. Client devices 136 through 144 may include personal computers, personal digital assistants (PDAs), portable music players, cellular telephones, on-demand radios, and similar devices.

A client input port in the client interface 126 of the database access server 100 may receive a data request for an item. The data request may include a data identifier to identify the desired item to be retrieved from the database server 110. The database access server 100 may receive the data request using a Lightweight Directory Access Protocol (LDAP).

Figure 2:
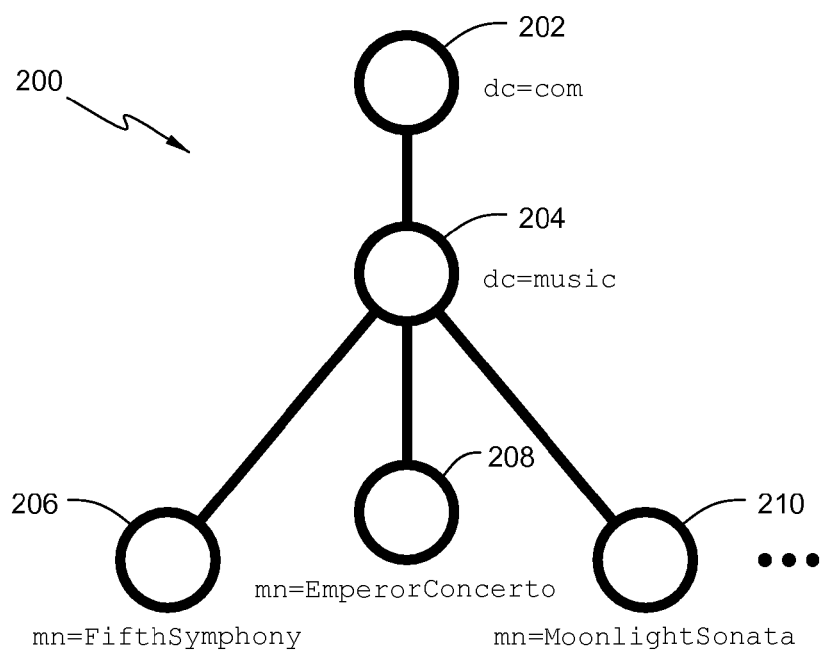
FIG. 2 is a schematic representation a directory that may be used with some embodiments of the invention.

As shown in FIG. 2, LDAP represents a database as a directory that is a tree 200 of directory entries 206, 208, 210. An entry consists of a set of attributes. An attribute has a name, which is an attribute type or attribute description, and one or more values. An attribute may have a subtype. The attributes are defined in a schema.

Each entry has a unique identifier, its Distinguished Name (DN). The DN may be composed of a number of parts that indicate where the directory entry is placed in the directory tree 200. For example, an entry 210 for the Moonlight Sonata may have the following DN:

dn: cn=MoonlightSonata, dc=music, dc=com

"MoonlightSonata" may be the Relative Distinguished Name (RDN) of the database entry 210; "music" 204 and "com" 202 may be domain components (DC) of the DN.

A database may contain a very large number of entries. The storage space required by a database may be considerable. The present invention allows one or more classes of items to be defined such that items in the defined class are stored in a compressed format. The invention further provides for a compression translator so that an item retrieved from the compressed class is decompressed before being sent in response to a request so that the compression of some classes of items is transparent to requesters. This may allow an existing database system to be compressed when it grows to a large size without affecting the users of the system.

In some embodiments, the data identifier indicating the item to be retrieved may be represented in an LDAP attribute. The item to be retrieved might, or might not, be stored in a compressed form. For example, a compressed file to be retrieved from an entry may have the following LDAP attribute:

file; compressionType: <compressed data>

The subtype, "compressionType", indicates the compression type for the file in the entry.

Returning to FIG. 1, the database access server 100 further includes control logic 120 and a compression translator 124. The control logic 120 receives a data request identifying a desired data item. The control logic 120 sends the request to the database server 110 to locate and retrieve the requested item. The database access server 100 retrieves the data over a data access link 112 that communicatively couples the database access server and the database server 110. The database access server 100 further determines if the retrieved data is compressed. The database access server 100 may determine if the retrieved data is compressed by referring to a configuration or schema for the database. In another embodiment, a tag or subtype may be a part of each item to indicate the compression type.

If the retrieved data is compressed, the control logic 120 directs the compression translator 124 to decompress the retrieved data. The uncompressed retrieved data is sent to a client output port in the client interface 126 to be transmitted to the client in response to the data request. It will be appreciated that if the retrieved data is not compressed, it is sent in the same form as retrieved.

In some cases, a requester may want the retrieved data to be sent in the compressed format if it is stored compressed to reduce the network bandwidth requirement. This may be supported in an LDAP database access server by using a subtype of "compressed" in the data request. This will be handled according to the invention by sending the retrieved data in the format as retrieved, without decompression. In another embodiment, the data request may include a request for a specific format compression. This may require the compression translator to translate the retrieved data from the compression format used for storage into the requested transmission format.

An exemplary system using the invention could be a system for delivering music files to clients. The music files could be maintained by a database server in which each file is maintained as an element of an item in the database. Each item could include identifying tags to allow the desired music file to be retrieved from the database. The identifying tags might include the title of the music, the performing artist, the composer, and the like.

The music files may be compressed to conserve storage space. The compression may be selected to preserve the quality of the music. For example, the Free Lossless Audio Codec (FLAC) may be used for audio compression. The FLAC compresses the audio data without removing any information from the audio stream. It is suitable both for everyday playback and audio archival. FLAC may achieve compression rates of 30-50%.

A database entry 210 including a compressed music file might appear in part as follows using LDAP Data Interchange Format (LDIF) for representing LDAP directory content:

```
dn: cn=MoonlightSonata,dc=music,dc=com
cn: MoonlightSonata
 :
file;flac: <flac encoded data>
 :
```

In one embodiment, the compression types for the files in the database are the same for all files. In another embodiment, the files may have various compression types, such as when the files are provided from a variety of sources in a variety of formats with differing levels of quality. In still another embodiment, the music files may be stored in a database with items that do not include music files. The non-music items may include compressed files where a different compression type suitable to the file type is used. For example, still photographs may be stored with Joint Photographic Expert Group (JPG) compression. In still another embodiment, items in the database may contain more than one file where each file may be of a different type and have a different compression type.

Client devices may require that music files be delivered with specific compression types as supported by the client device. The compression type may be selected for efficient processing by the client device and/or efficient delivery over the connection to the database access server. It may be desirable to use a compression type that provides a more compressed format than the compression type of the files stored in the database. Lossy codecs can achieve ratios of 80% or more by discarding data from the original stream. Examples of lossy compression types include Windows Media Audio (WMA), Motion Picture Experts Group Audio Layer 3 (MP3), Ogg Vorbis (OGG), and Advanced Audio Coding (AAC).

Compression types required by client devices may depend on the use that will be made of the files. For example, the client device may be able to save music files to be played at a later time and to play music files immediately as they are delivered to the client device (streaming). It may be desirable to use a more compressed format optimized for immediate playback for files to be played immediately in a streaming mode. A less compressed format that provides a higher quality of sound may be used for files to be saved.

Because of the variety of compression types required by client devices, which may vary depending on the operating mode of the client device, it may not be practical for the database access server to determine what file format is appropriate for delivery to the client device. Hence, in one embodiment, the client device is allowed to request the type of compression for the file to be sent by the database access server to the client device.

Referring to FIG. 1, a client 136 may request an attribute using an LDAP Universal Resource locator (URL). For example, the client may have identified that a desired file is in the entry having the following DN:

dn: cn=MoonlightSonata, dc=music, dc=com

The client may request the "Moonlight Sonata" file with AAC compression using the following LDAP URL:

```
ldap://ldap.music.com/cn=MoonlightSonata,
  dc=music,dc=com?file;aac
```

The database access server 100 receives the LDAP URL as a data request. The LDAP cn attribute, MoonlightSonata, provides a data identifier. The subtype, aac, indicates the compression type being requested. The requested file may be stored with a different compression type from the requested compression type. For example, the file for MoonlightSonata may be stored with the FLAC compression type. The database access server 100 retrieves the requested file without regard to the requested compression format.

The control logic 120 of the database access server 100 retrieves data having the data identifier from the database server 110. The control logic 120 determines if the retrieved data is compressed. The control logic 120 may consult a database configuration or schema to determine if the data is compressed, examine the retrieved data, or receive an indication of the compression type of the retrieved data from the database server 110.

The control logic 120 causes the retrieved data to be decompressed by the compression translator 124. The compression translator 124 may decompress the retrieved data using the compression type as stored, and then compress it according to a requested compression type. The reformatted data is sent to the requesting client 136 in response to the data request.

Figure 3:
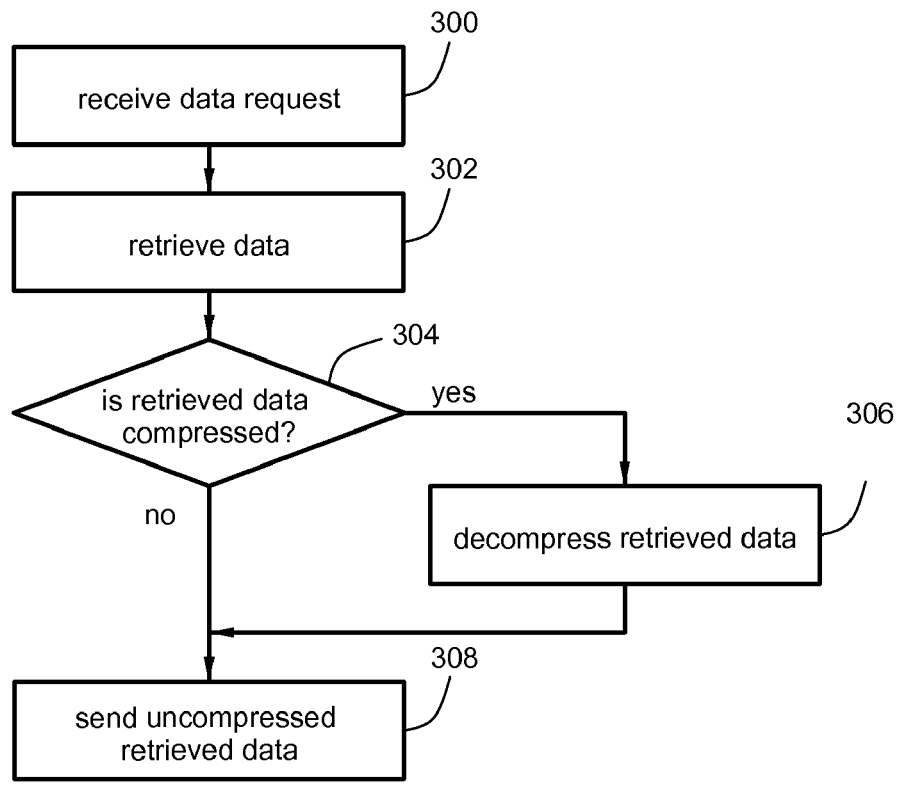
FIG. 3 is a flowchart of one embodiment of a method for providing data that may be stored in a compressed format.

FIG. 3 is a flowchart for a method for processing data requests that embodies the invention. The method may be performed by processing logic that may comprise hardware (e.g., circuitry, dedicated logic, programmable logic, microcode, etc.), software (such as instructions run on a processing device), or a combination thereof. In one embodiment, the method is performed by a database access server 100 of FIG. 1.

A data request that includes a data identifier and a first compression type is received at block 300. At block 302, data having the data identifier and a second compression type is retrieved. The retrieved data was compressed according to the second compression type. If the second compression type is not the same as the first compression type (block 304), the retrieved data is reformatted to create reformatted data compressed according to the first compression type (block 306). The reformatted data is sent in response to the data request (block 308).

Figure 4:
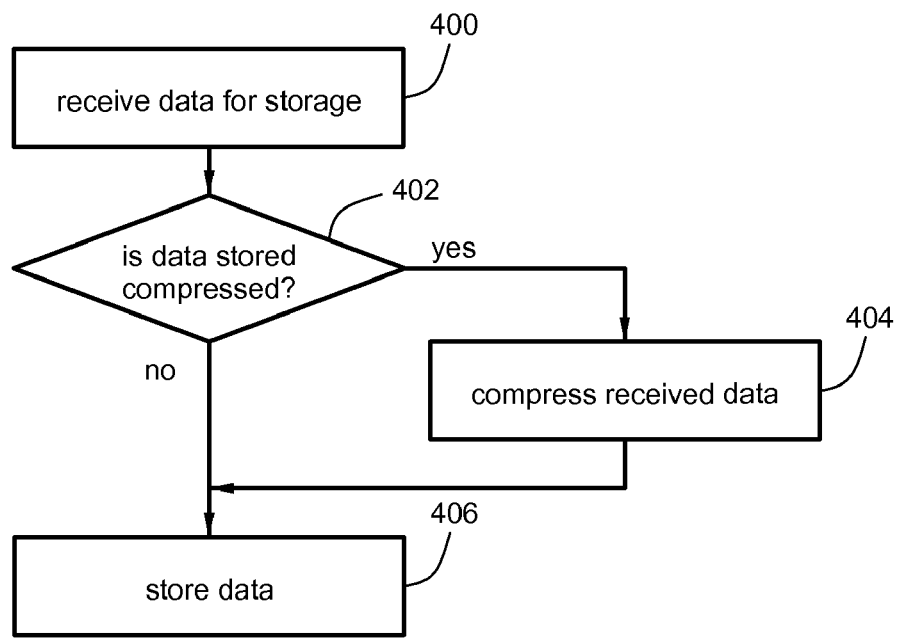
FIG. 4 is a flowchart of one embodiment of a method for storing data in a compressed format.

FIG. 4 is a flowchart for a method for processing data received for storage that embodies the invention. The method may be performed by processing logic that may comprise hardware (e.g., circuitry, dedicated logic, programmable logic, microcode, etc.), software (such as instructions run on a processing device), or a combination thereof. In one embodiment, the method is performed by a database access server 100 of FIG. 1.

Data for storage as an item is received at block 400. At block 402, it is determined if the item is configured to be stored in a compressed format. If so, the data is compressed (block 404). The received data, compressed if necessary, is then stored (block 406).

Figure 5:
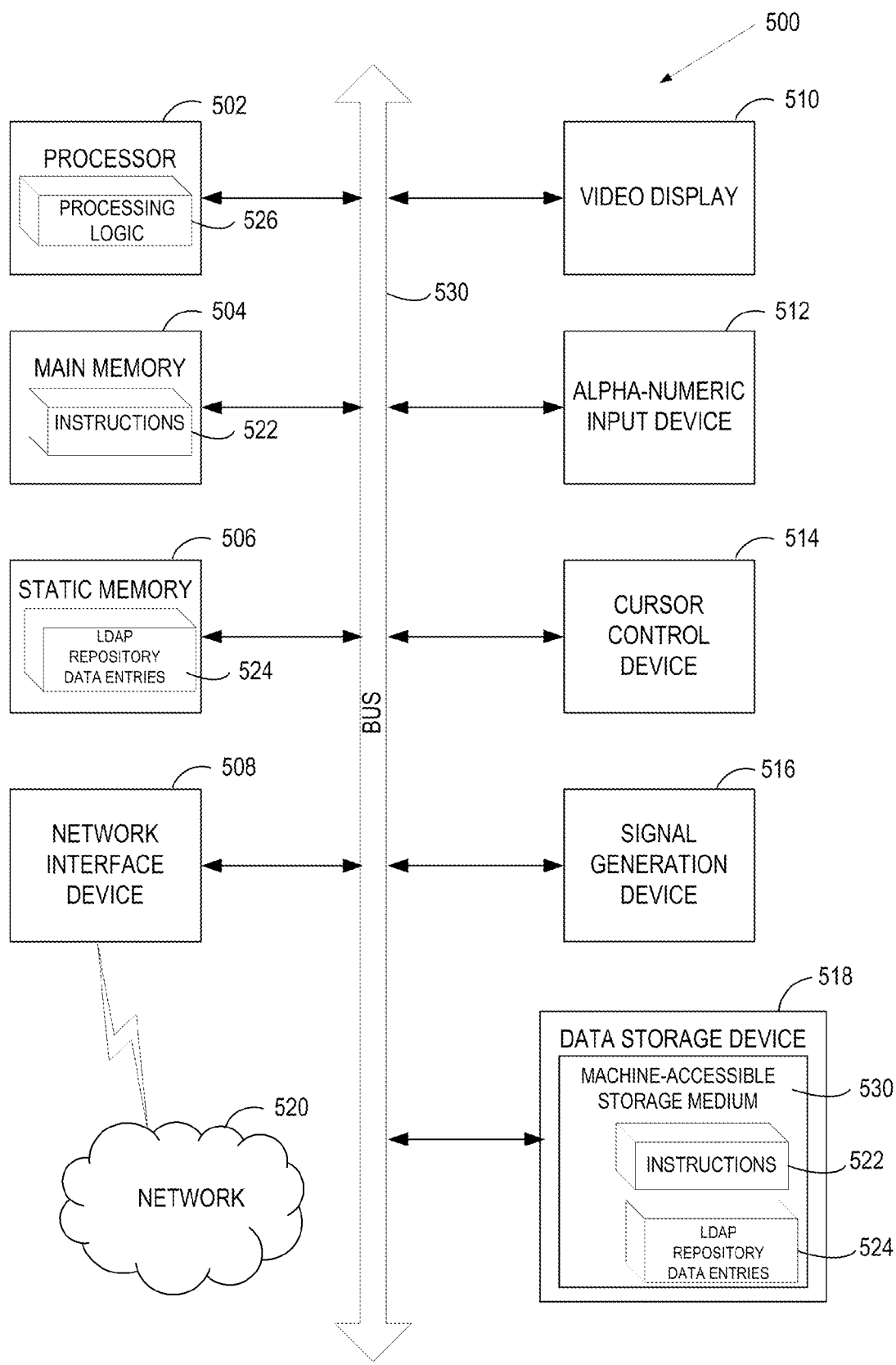
FIG. 5 illustrates a block diagram of an exemplary computer system implementing some embodiments of the present invention.

FIG. 5 illustrates a diagrammatic representation of a machine in the exemplary form of a computer system 500 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 500 includes a processing device 502, a main memory 504 (e.g., read-only memory (ROM), flash memory, dynamic random access memory (DRAM) such as synchronous DRAM (SDRAM) or Rambus DRAM (RDRAM), etc.), a static memory 506 (e.g., flash memory, static random access memory (SRAM), etc.), and a data storage device 518, which communicate with each other via a bus 530.

Processing device 502 represents one or more general-purpose processing devices such as a microprocessor, central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 502 may also be one or more special-purpose processing devices such as an application specific integrated circuit (ASIC), a field programmable gate array (FPGA), a digital signal processor (DSP), network processor, or the like. The processing device 502 is configured to execute the processing logic 526 for performing the operations and steps discussed herein.

The computer system 500 may further include a network interface device 508. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 516 (e.g., a speaker).

The data storage device 518 may include a machine-accessible storage medium 530 on which is stored one or more sets of instructions (e.g., software 522) embodying any one or more of the methodologies or functions described herein. The software 522 may also reside, completely or at least partially, within the main memory 504 and/or within the processing device 502 during execution thereof by the computer system 500, the main memory 504 and the processing device 502 also constituting machine-accessible storage media. The software 522 may further be transmitted or received over a network 520 via the network interface device 508.

The machine-accessible storage medium 530 may also be used to store LDAP repository data entries 524. LDAP repository data entries 524 may also be stored in other sections of computer system 500, such as static memory 506.

While the machine-accessible storage medium 530 is shown in an exemplary embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instructions for execution by the machine and that cause the machine to perform any one or more of the methodologies of the present invention. The term "machine-accessible storage medium" shall accordingly be taken to include, but not be limited to, solid-state memories, optical and magnetic media, and carrier wave signals.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A Lightweight Directory Access Protocol (LDAP) database access server comprising:

a network interface device to receive, from a client device, a data request message requesting retrieval of data stored in a LDAP database communicably coupled to the LDAP database access server, wherein the data request message includes both of a data identifier that identifies the data and an indication that the data is requested by the client device to be transferred in a specific compressed format; and a processing device, coupled to the network interface device via a bus, the processing device operable to:

retrieve data having the data identifier from the LDAP database, where the data is stored in the LDAP database in a compressed format that is transparent to the client device, wherein the format of the stored data is not communicated to the client device, and determined by the LDAP database access server according to a class of item in which the data is categorized;

determine if the retrieved data is in the specific requested compressed format;

reformat the retrieved data to provide the specific requested compression format if the retrieved data is not in the requested compression format; and send the compressed retrieved data to the client device in the requested specific compressed format in response to the data request.

2. The LDAP database access server of claim 1 wherein the network interface device is further to receive other data for storage as an item, and the processing device is further:
 to determine if the item is configured to be stored in a compressed format,
 to compress the other data if the item is configured to be stored in a compressed format, and
 to store the compressed other data as the item.

3. The LDAP database access server of claim 2 wherein the processing device determines if the item is configured to be stored in the compressed format by a configuration of the LDAP database access server.

4. The LDAP database access server of claim 2 wherein the network interface device receives the data for storage using LDAP, in which the data for storage comprises an LDAP attribute identifying data to be stored.

5. The LDAP database access server of claim 1 wherein the processing device is further to decompress the retrieved data if the retrieved data is compressed and is not in the requested specific compressed format.

6. The database access server of claim 1, wherein the processing device retrieves the data having the data identifier using LDAP, in which the data comprises an LDAP attribute identifying the data.

7. A method for processing data requests comprising:
 receiving, at a Lightweight Directory Access Protocol (LDAP) database access server, a data request message from a client device requesting retrieval of data stored in a LDAP database communicably coupled to the LDAP database access server, wherein the data request message includes both of a data identifier that identifies the data and an indication that the data is requested by the client device to be transferred in a specific compressed format;
 retrieving data from the LDAP database having the data identifier, where the data is stored in the LDAP database in a compressed format that is transparent to the client device, wherein the format of the stored data is not communicated to the client device, and determined by the LDAP database access server according to a class of item in which the data is categorized;
 determining if the retrieved data is in the requested specific compressed format;
 reformatting the retrieved data to provide the specific requested compression format if the retrieved data is not in the requested compression format; and
 sending the compressed retrieved data to the client device in the requested specific compressed format in response to the data request.

8. The method for processing data requests of claim 7 further comprising:
 receiving other data for storage as an item;
 determining if the item is configured to be stored in a compressed format;
 compressing the other data if the item is configured to be stored in a compressed format; and
 storing the compressed other data as the item.

9. The method for processing data requests of claim 8 wherein determining if the item is configured to be stored in the compressed format further comprises accessing a configuration of the LDAP database access server.

10. The method for processing data requests of claim 8 wherein receiving the data for storage further comprises using LDAP, in which the data for storage comprises an LDAP attribute identifying data to be stored.

11. The method for processing data requests of claim 7, wherein the method further comprises decompressing the retrieved data if the retrieved data is compressed and is not in the requested specific compressed format.

12. The method for processing data requests of claim 7, wherein the data having the data identifier is retrieved using LDAP, in which the data comprises an LDAP attribute identifying the data.

13. An article of manufacture comprising a machine-accessible storage medium including data that, when accessed by a machine, causes the machine to perform a method comprising:
 receiving, at a Lightweight Directory Access Protocol (LDAP) database access server, a data request message from a client device requesting retrieval of data stored in a LDAP database communicably coupled to the LDAP database access server, wherein the data request message includes both of a data identifier that identifies the data and an indication that the data is requested by the client device to be transferred in a specific compressed format;
 retrieving data from the LDAP database having the data identifier, where the data is stored in the LDAP database in a compressed format that is transparent to the client device, wherein the format of the stored data is not communicated to the client device, and determined by the LDAP database access server according to a class of item in which the data is categorized;
 determining if the retrieved data is in the requested specific compressed format;
 reformatting the retrieved data to provide the specific requested compression format if the retrieved data is not in the requested compression format; and
 sending the compressed retrieved data to the client device in the requested specific compressed format in response to the data request.

14. The article of manufacture of claim 13 wherein the method further comprises:
 receiving other data for storage as an item;
 determining if the item is configured to be stored in a compressed format;
 compressing the other data if the item is configured to be stored in a compressed format; and
 storing the compressed other data as the item.

15. The article of manufacture of claim 14 wherein determining if the item is configured to be stored in the compressed format further comprises accessing a configuration of the LDAP database access server.

16. The article of manufacture of claim 14, wherein receiving the data for storage further comprises using LDAP, in which the data for storage comprises an LDAP attribute identifying data to be stored.

17. The article of manufacture of claim 13, wherein the machine accessible storage medium further includes data that, when accessed by a machine, causes the machine to perform a method further comprising decompressing retrieved data if the retrieved data is compressed and is not in the requested specific compressed format.

18. The article of manufacture of claim 13, wherein the data having the data identifier is retrieved using LDAP, in which the data comprises an LDAP attribute identifying the data.

* * * * *